United States Patent [19]

Taylor et al.

[11] Patent Number: 4,805,726
[45] Date of Patent: Feb. 21, 1989

[54] CONTROLLED IMPLOSIVE DOWNHOLE SEISMIC SOURCE

[75] Inventors: D. Thomas Taylor; James E. Brooks, both of Houston, Tex.

[73] Assignee: Schlumberger Technology Corporation, Houston, Tex.

[21] Appl. No.: 797,301

[22] Filed: Nov. 12, 1985

[51] Int. Cl.$^4$ .............................................. G01V 1/40
[52] U.S. Cl. .................................... 181/106; 367/146; 181/113
[58] Field of Search ................. 367/146, 25, 154, 911; 181/102, 104, 106, 111, 113, 118, 120, 401

[56]  References Cited

U.S. PATENT DOCUMENTS

| | | | |
|---|---|---|---|
| 2,361,558 | 11/1940 | Mason | 255/1.8 |
| 2,894,597 | 7/1959 | Kean et al. | 367/912 |
| 3,221,833 | 12/1965 | Malmberg | 181/0.5 |
| 3,367,442 | 2/1968 | Setser | 181/106 |
| 3,587,775 | 6/1971 | Baier | 181/0.5 |
| 3,718,205 | 2/1973 | Fair et al. | 181/0.5 H |
| 3,909,776 | 9/1975 | Broding et al. | 340/17 |
| 4,038,631 | 7/1977 | Murphy | 340/15.5 |
| 4,144,949 | 3/1979 | Silverman | 181/106 |
| 4,253,539 | 3/1981 | Magneville | 367/146 |
| 4,300,654 | 11/1981 | Raymond et al. | 181/120 |
| 4,457,370 | 7/1984 | Wittrisch | 166/250 |
| 4,497,044 | 1/1985 | Silverman | 181/111 |

FOREIGN PATENT DOCUMENTS

FI/830068 of 0000 PCT Int'l Appl. .

OTHER PUBLICATIONS

Hardee, H. D., "Downhole Periodic Seismic Sources", 31 Geophysical Prospecting 57–71 (1983).

Orr, M. and Schoenberg, M., "Acoustic Signatures From Deep Water Implosions of Spherical Cavities", 59 Journal of Acoustical Society of America, 1155, No. 5 (1976).

Reader, W. T. and Chertock, G., "Transient Sounds Due to Implosions of Simple Structures Under Hydrostatic Pressure", presented at 82nd Meeting of the Acoustical Society of America, Denver, Colo., Oct. 19, 1971.

Urick, R. J., "Implosions as Sources of Underwater Sound", Journal of Acoustical Society of America, p. 2026 (1964).

Primary Examiner—Thomas H. Tarcza
Assistant Examiner—Ian J. Lobo
Attorney, Agent, or Firm—Henry N. Garrana; John H. Bouchard

[57] ABSTRACT

A controlled implosive downhole seismic source having a substantially hollow closed vessel body adapted to be lowered in a borehole and means for selectively causing at least a portion of the vessel body to implode under pressure thereby producing seismic waves.

20 Claims, 2 Drawing Sheets

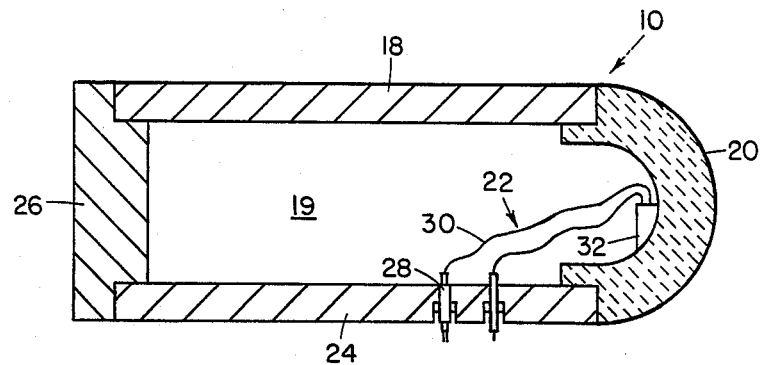
FIG.1
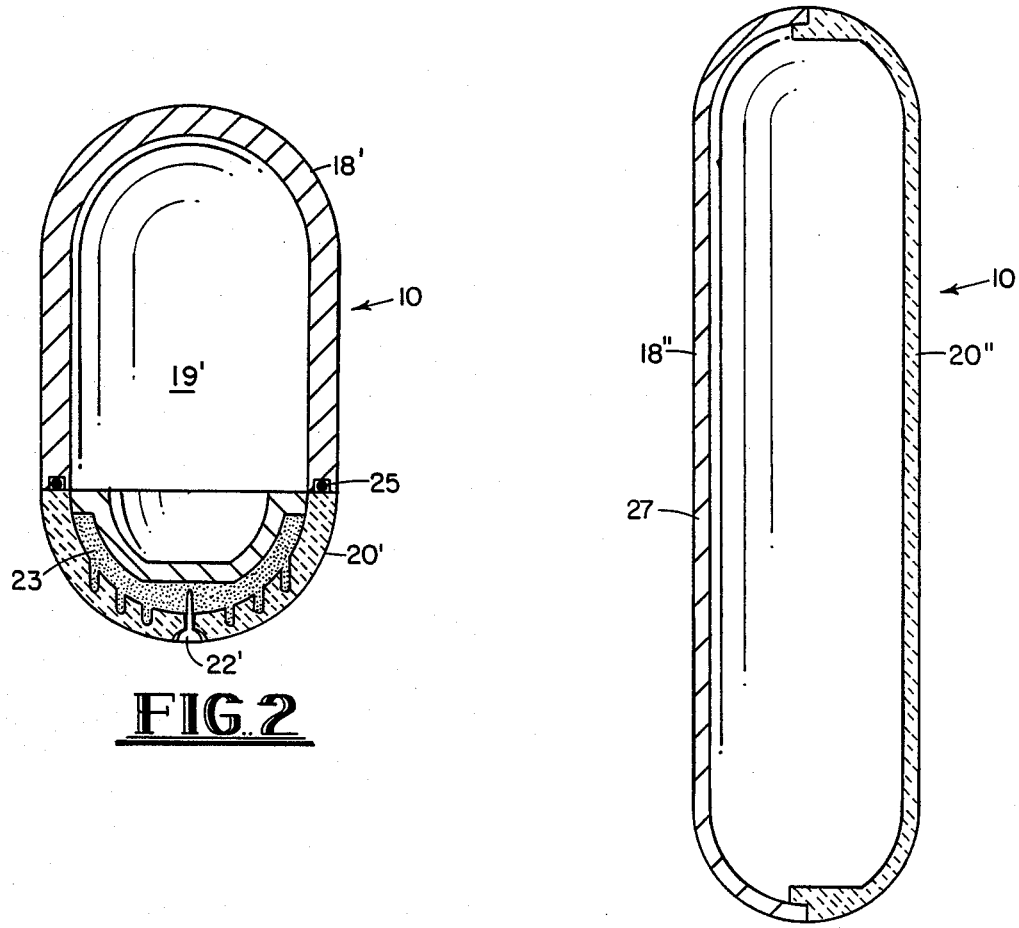
FIG.2
FIG.3

CONTROLLED IMPLOSIVE DOWNHOLE SEISMIC SOURCE

BACKGROUND OF THE INVENTION

The present invention relates to downhole seismic sources. More specifically, the present invention relates to a controlled implosive downhole seismic source.

Because the present invention is particularly useful in downhole applications, the invention will be described in relation to that use. The present invention, however, is also useful as a seismic source in other applications where power requirements, depth of operation, and hydrostatic pressure impose operating limitations on other seismic sources.

In the field of seismology, a wide variety of approaches have been used to create and detect seismic waves. It is known, of course, that seismic sources and seismic detecting means may be placed downhole or on the surface, or any combination thereof. Thus, among the various configurations, it is known to place the seismic source downhole with the detecting means on the surface, or vice versa, or with both on the surface, or with both downhole, or with the detecting means both on the surface and downhole.

It is also known that placing the source downhole contains several distinct advantages over placing the source on the surface. First, a downhole source is usually closer to the critical layers of strata which the operator is interested in, particularly in oil and gas exploration. Thus, less energy from the seismic source is lost in traveling to the desired strata layers. Second, most of the earth's surface is covered by a weathered layer of strata which consists of topsoil and fragmented bedrock. That weathered layer of strata often creates problems in sending or receiving seismic waves because of that layer's porosity. Surface sources typically put as much as two-thirds of their energy into unwanted surface or Rayleigh waves. Third, the remaining third of the energy, which contains the desired P-waves and S-waves, may be largely lost due to the porous nature of the weathered surface layers. See; Hardee, *Downhole Periodic Seismic Sources*, Geophysical Prospecting 31, 57–71 (1983). Fourth, a surface seismic source must also compete with other surface noises caused by man-made vibration of the earth's surface. Particularly if the testing site is near a concentrated man-made activity, such as a construction site or a highway, waves generated by a surface source will mix with those background noises and the readability of the seismic data is seriously impaired.

For those reasons, the field of seismology has long sought a downhole seismic source capable of operating under adverse conditions and yet generating acceptable seismic waves. A variety of downhole seismic sources have been suggested as attempts to achieve those goals and overcome those longstanding problems in the field. The most common type of downhole source is an explosive source. However, the explosive source has several disadvantages. First, the explosive source can damage or destroy the borehole. That result limits the use of an explosive source in the actual well bore because of the cost of potentially re-drilling the well and the potential for damage to the formation. The inability to use the source in the well bore is a significant operating limitation when seismic work is being used to map out the boundaries of a developed oil and gas field. In those cases, it is often desirable to dispose the seismic source in the well bore to find the boundaries of such structures as salt domes and subsurface inclines. Because those structures extend generally in a vertical direction, it is often necessary to determine the precise horizontal distances from an existing well at which the structures are found to avoid missing the field altogether on the next well.

A second drawback to the explosive downhole seismic source is the lack of control over the quality of the seismic source generated. Explosions, by nature, are violent reactions not prone to manipulation. It has also been recognized in the art that explosive downhole sources propagate a larger percentage of high frequency waves than is desired, but low frequency waves are usually the waves that reveal the most valuable data. See; Hardee, *Downhole Periodic Seismic Sources*, Geophysical Prospecting 31, 58 (1983).

In an effort to overcome the disadvantages of an explosive downhole source, a variety of prior art devices have attempted to create downhole sources which do not damage the borehole and which give the operator more control over the frequency of the waves propagated. Examples of such devices are disclosed in PCT Application No. F183/00068 and U.S. Pat. Nos. 4,038,631; 3,909,776; 3,718,205; 3,587,775; and 3,221,833. Except for U.S. Pat. No. 3,587,775, all of those devices create a seismic source downhole by mechanical operation, such as air guns, mechanical hammers, and similar devices. U.S. Pat. No. 3,587,775 discloses a controlled explosive source in which water is disassociated into hydrogen and oxygen and then ignited to provide a seismic source.

However, the devices disclosed in those references suffer from several operating limitations, including: power, depth and hydrostatic pressure.

Power is an operational limitation faced by any mechanical device. If the seismic source is powered from the surface of the borehole, additional equipment, such as an independent source of power, must be run into the hole along with the logging cable because a normal logging cable can only pass a maximum of one horsepower, which is less than the power requirements of most such mechanical devices, down a well. Explosive seismic sources are not faced with that limitation; the power supplied to the source is self contained and not dependent on any connection to the surface, except for the small amount of power needed to ignite the explosive charge.

However, unless an independent source of power is included in the device lowered downhole, problems with the second operational limitation (depth) are encountered. The mechanical devices shown in the reference mentioned above are connected to the surface by hoses or other means to provide air, fluid, or other materials required to drive those mechanical devices. If the seismic source is needed at depths over a few hundred feet, those additional cables, hoses, and other means, prove too heavy and cumbersome for practical operation. Thus, a second need is defined by finding a downhole source capable of going to significant depths, which necessitates that the source have a self contained power source.

The third operational limitation, hydrostatic pressure, is also an operating limitation for mechanical devices and explosive devices. As depth increases in the well, the hydrostatic pressure of drilling fluid, water and other materials in the borehole also increases the pressure on any seismic source placed in the well. For explosive devices, that increases means that much of the explosive power is absorbed by the hydrostatic pressure. For mechanical devices, the device must be insulated or sealed from the surrounding fluid such that the fluid will not interfere with any moving parts, air outlets, or other similar features of the device.

What the devices known in the prior art have failed to realize is that hydrostatic pressure can serve as a power source itself and does not require the addition of any hoses or other cumbersome equipment to power the seismic source.

The present invention takes advantage of that natural power source and frees the field of seismic sources from most operational limitations of depth or power. That is achieved through the present invention by providing an implosive device which is ruptured on command and which uses the power applied by the hydrostatic pressure on the fluid surrounding the device to create a seismic source. To the best of Applicant's knowledge, a controlled implosive seismic source has never been utilized in a borehole, although there have been limited experiments with implosive devices used as sources of underwater sound at shallow depths; See; Orr, M. and Schoenberg, M., "Acoustic Signatures From Deep Water Implosions Of Spherical Cavities", *Journal of Acostical Society of America,* Vol. 59, No. 5, pg. 1155 (May 1976), Reader, W. T. and Chertock, G. "Transient Sounds Due to Implosions of Simple Structures Under Hydrostatic Pressure", presented at 82nd meeting of Acoustical Society of America (Oct. 19, 1971), and Urick, R. J., "Implosions as Sources of Underwater Sound", *Journal of Acoustical Society of America,* pg. 2026 (1964). The differences between those shallow underwater experiments and a useable downhole seismic source are several.

The devices disclosed in those publications were crude experimental underwater devices and not the type of device that would be useful in a well bore. Further, those devices could not be imploded at predetermined depths, or at predetermined times, and were imploded only as a function of pressure. That limitation makes the timing of recording equipment used to detectthe source very cumbersome. Those crude devices could not be initiated remotely, and when coupled with the other factors showing a lack of control over the implosion, it is clear that those devices were not practical seismic sources because, among other factors, no more than one of those devices could be lowered into the fluid medium at a time. As explained, it is desired to be able to fire a sequence of shots when generating seismic sources.

Therefore, it is a principal object of the present invention to provide a novel apparatus for a controlled implosive downhole seismic source.

It is a further object of the present invention to gain the advantages set out above without being limited as a practical matter to the depth at which the source may operate.

It is another object of the present invention to provide a device having sufficient power to produce high quality seismic waves without damaging the borehole.

It is yet a further object of the present invention to provide a device and method able to operate under high hydrostatic pressure.

Other objects, features, and advantages of the invention will become evident in light of the following detailed description considered in conjunction with the referenced drawing of a preferred exemplary controlled implosive seismic source according to the present invention.

SUMMARY OF INVENTION

An implosive source derives its energy from the high pressure encountered downhole; the higher the pressure, the stronger the source output. Such devices involve the sudden collapse of a cavity—the collapse being driven by the hydrostatic pressure of the surrounding fluid—and the abrupt reversal of the momentum of the collapsing wall. A typical device might be a thin-walled sphere or cylinder made of ceramic or glass which is ruptured upon command. The water would rush in from all sides when the sphere or cylinder is ruptured, causing an intense pressure wave to be generated when the walls of water collide.

The device embodying the invention described herein is a controlled implosive device. The implosion is selective, i.e. on command, and the shape of seismic output signature can be preselected. Further, the collapsing wall is made to collide at the same time along a front.

In general terms, the present invention is directed toward a downhole seismic source device, having a substantially hollow vessel body adapted for lowering into a borehole, and means for rupturing or weakening at least a portion of said vessel body to cause it to implode. That vessel body, in the preferred embodiment, forms a closed vessel chamber. A cap sealingly covers an opening in that vessel chamber, with a means for rupturing or weakening that cap. In the preferred embodiment, the cap is made of a ceramic or similar material. The material should be able to withstand the corrosiveness of well fluid for at least several hours. It should be capable of forming an airtight seal with the vessel body and with enough strength to withstand pressure pulses caused by other sources imploding nearby while still withstanding the rigors of the descent into the well. The material should be highly fragmentable such that it will break into small pieces and not create significant additional abrasive material which would impede the drilling process or require subsequent removal of the fragments.

The means for rupturing or weakening the cap may be any suitable means, however, the current preferred embodiment of the invention is the use of an explosive material such as a powder charge. A selective detonating means is employed to detonate the charge and can be a conventional detonating assembly used with explosive seismic sources. Other means include a firing pin mechanism driven electromechanically, hydrostatically, by a spring or by a weight drop. A bullet may be fired into the implosion chamber wall either from the outside or inside of the chamber. Also, a controlled release break bolt or break plug technique could be used. The characteristics required of a rupturing means suitable for use in the present invention are devices which present sufficient localized stress to stimulate massive failure of the device. In the preferred embodiment, a suitably sized explosive charge is placed in relatively close proximity to the cap or, alternatively, may be imbedded within the cap. The size of the explosive charge is chosen such that detonation will weaken or rupture the cap, i.e. that portion of the vessel body adapted to rupture, without damaging the remainder of the vessel body. It is preferable that the rupturing or weakening is accomplished upon command by a firing mechanism. The implosive effect may be caused primarily by a vaccum created within the hollow vessel chamber, or by hydrostatic pressure within the borehole, or both. It is contemplated that a plurality of substantially hollow vessels may be imploded, and may be imploded at prescribed intervals of time, at varying depths in the borehole, or simultaneously at one depth.

As an alternative embodiment of the invention a piston and piston stop are disposed within the vessel chamber. The piston, operable within the vessel chamber, is adapted to be driven by the implosion against the piston stop to create or produce seismic waves.

The invention includes a control mechanism that can be used to release a piston for purposes of an implosion or a device which instantaneously opens a chamber to well bore hydrostatic pressure for the purposes of using an implosion as a seismic source.

DESCRIPTION OF THE DRAWINGS

FIG. 1 is a cross-sectional view illustrating a first embodiment of a seismic source pursuant to the present invention.

FIG. 2 is a cross-sectional view illustrating a second embodiment of a seismic source pursuant to the present invention.

FIG. 3 is a cross-sectional view illustrating a third embodiment of a seismic source pursuant to the present invention.

DESCRIPTION OF PREFERRED EMBODIMENT

Figure 4:
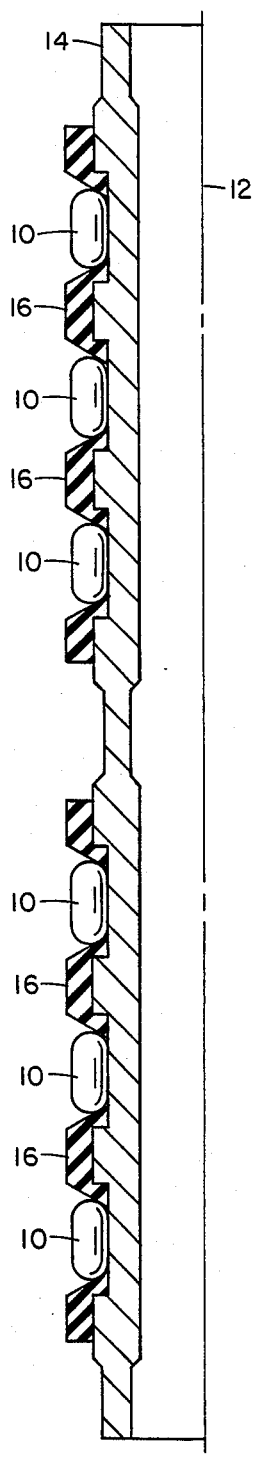
FIG. 4 is a side view illustrating a series of seismic sources pursuant to the present invention arranged on a tool for lowering downhole.

The structure of the downhole seismic source pursuant to the present invention may vary according to the conditions under which the seismic source is being used. Variations in the structure and assembly of the seismic sources may be necessitated to alter the types and qualities of the seismic waves generated and in response to varying economic considerations. Such changes will be discussed below.

Referring now to FIG. 1, a first illustrative embodiment of a controlled implosive seismic source 10 pursuant to the present invention is shown. Although the present invention contemplates both disposable and reuseable seismic sources, the invention and the presently preferred embodiment will be described in terms of a reuseable seismic source. The controlled implosive seismic source 10 pursuant to the present invention comprises a vessel body, generally designated 18, which is adapted to be lowered into a borehole and which forms a closed vessel chamber 19. In the embodiment shown in FIG. 1, vessel body 18 is formed by a cylindrical body 24 and two end caps, 26 and 20. Cylindrical body 24 forms two openings. A first end cap 26 is secured to and closes one of the two openings in cylindrical body 24. It is contemplated that the cylindrical body walls 24 and first end cap 26 of vessel chamber 18 would be manufactured using a material of sufficient strength and durability to withstand pressures up to 20,000 psi and the force of the resulting implosion. First end cap 26 and cylindrical body 24 should be joined in a fluid-tight and airtight relationship. A destructible second end cap 20 is secured over the other end of cylindrical body 24. Second end cap 20 should likewise be made of a sufficiently strong material that would allow it to withstand pressures up to 20,000 psi. However, second end cap 20 should also be capable of being ruptured by a reasonably small force to allow the vessel body 18 to be preserved and reused. In the present embodiment, second end cap 20 is made of a ceramic material. Ceramic materials are capable of withstanding high compression pressures, but they are also very brittle and can be shattered easily. It is desired that second end cap 20 be capable of shattering into fairly small fragments, so the well bore is not left cluttered with abrasive or other foreign matter after the testing is done.

A rupturing means, generally designated 22, is provided which can take a variety of forms. In the first embodiment shown in FIG. 1, rupturing means 22 is an explosive type rupturing means with connectors 28 communicating through cylindrical body 24 for connection to a firing mechanism (not shown). Leads 30 connect connectors 28 to an explosive material 32 shaped and sized to rupture end cap 20 without damaging the remainder of vessel body 18.

Alternative rupturing means 22 are contemplated which would selectively rupture end cap 20 or other configurations of vessel bodies 18. For example, if the vessel body 18 were entirely made of ceramic, a rupturing means 22 could be provided in the carrier 14 (see FIG. 5) in the form of an explosive projectile or bullet, or an electromechanically or hydrostatically actuated firing pin. Again, considerations such as economics of production, the quality of the source desired to be produced, and other considerations will dictate what type of vessel body design and rupturing means will be employed.

In the present invention, including the embodiment illustrated in FIG. 1, the assembly process of seismic source 10 will depend upon the conditions under which it is to be used. For example, for tests at depths where suitable high hydrostatic pressure results, source 10 need merely be assembled and run downhole. However, at shallower depths where seismic source 10 would not have adequate hydrostatic pressure to generate sufficiently powerful seismic waves, an improved seismic wave is generated if a vacuum is maintained inside vessel chamber 19. A vacuum will aid seismic source 10 of the present invention in producing a more powerful wave because of the larger differential in pressure between the exterior of the seismic source 10 and the the vessel chamber 19.

A second embodiment of a seismic source 10 pursuant to the present invention is illustrated in FIG. 2. That embodiment is anticipated as being a more economical version of the embodiment shown in FIG. 1 due to the simpler design of the vessel body 18' and rupturing means 22'. As in the embodiment of FIG. 1, vessel body 18' forms a closed vessel chamber 19'. Vessel body 18' includes a portion adapted to rupture, in this case a destructible end cap 20'. The rupturing means 22' in this embodiment is a small blasting cap 22' imbedded within end cap 20'. End cap 20' contains an explosive material such as a charge of powder 23 for rupturing end cap 20' upon detonation of blasting cap 22'. The cap 20' shown in FIG. 2 may be provided with threads for threadably engaging cooperating threads formed on vessel body 18'. Alternatively, end cap 20' may be secured by any suitable means to vessel body 18' to priovide an airtight, fluidtight vessel chamber 19'. Seals 25 placed at the junction of end cap 20' and vessel chamber 18' may be used to effect that airtight, fluidtight function, particularly if end cap 20' is threadably engaged to vessel chamber 18'. The seal should be constructed to withstand pressures up to 20,000 p.s.i.

In both the embodiments of FIG. 1 and FIG. 2, the openings defined by the walls of vessel body 18 or 18' and covered by destructible caps 20 and 20' should be of sufficient size to provide for rapid fluid communication with the interior of the vessel chamber 19. In a non-reuseable form, or to create particular seismic waves, the device of the present invention can be constructed such that vessel body 18 is collapsed along with end cap 20. As pointed out above, seismic waves are produced by the inrushing wall of fluid which creates an intense pressure wave upon striking the interior walls and end of vessel chamber 19. Seismic waves are also produced when two walls or faces of fluid strike each other. That is the case when a whole vessel is collapsed. The opening of the vessel body sealed by cap 20' is selectively sized (and the shape of the vessel body and vessel chamber varied) to create seismic waves having various characteristics. Thus, a device which quickly opens a valve (not shown) to allow fluid to enter the chamber 19 may be feasible, instead of rupturing a portion of the vessel body 18. Such a valve (not shown) would be relatively large, to allow the fluid to enter the vessel chamber 19 rapidly enough to create an implosive effect, yet the valve (not shown) must be able to maintain the airtight relationship until it is opened. A wide variety of designs are feasible, including an end cap 20 which could slide, swivel, or swing open to expose the vessel chamber 19. An advantage of a mechanical implosive seismic source 10, is that it may be feasible to reseal the source 10 and evacuate the fluid so that a single source 10 could be used for a number of shots.

If a seismic wave having a higher percentage of low frequency propagating waves is desired, the surface area on which the implosion impacts should be increased. The embodiment shown in FIG. 3 provides such an increased area. In lieu of an end cap 20 being placed over an open end of a vessel body 18, vessel body 18" may be formed of a trough shaped body member 27 and a destructible portion 20". One of the rupturing means 22 (not shown in FIG. 3), previously described, may then be positioned so as to cause destructible portion 20" to selectively rupture on command and cause it to collapse into body member 27.

Figure 5:
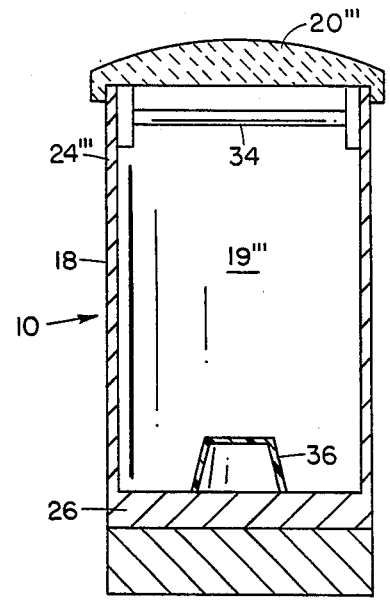
FIG. 5 is a cross-sectional view illustrating a fourth embodiment of a seismic source pursuant to the present invention.

FIG. 5 illustrates another embodiment of a controlled implosive seismic source 10 pursuant to the present invention. In some applications, it is desirable to maintain strict control over the seismic wave propagated. The implosions resulting from the devices shown in the other embodiments can be controlled by varying the size and shape of the vessel body 18 and the vessel chamber 19 to alter the pattern of waves reflected by the vessel chamber 19 when the fluid crashes into the interior of the vessel body 18 defining that chamber 19. The embodiment shown in FIG. 5 is designed to allow more control over the wave propagated. A free sliding piston 34 is disposed inside vessel chamber 19''' near the top of the vessel chamber 19''' adjacent end cap 20'''. A piston stop 36 is disposed in the opposite end of chamber 19'''. Piston 34 should closely and slidingly engage the interior of the cylindrical body 24'''. As the cap 20''' is ruptured, hydrostatic pressure drives piston 34 downward in vessel chamber 19'''. Piston 34 strikes a piston stop 36 disposed at the first end cap 26''' of the vessel chamber 19'''. A seismic wave is propagated as piston 34 strikes piston stop 36. That embodiment provides a highly controllable seismic source. The frequency spectrum of the signal may be controlled by changing the rigidity of the piston stop 36. It is noted that other methods of starting the piston 34 travel could be employed other than rupturing the end cap 20'''. For example, the piston 34 may be held by a release mechanism (not shown) which would release the piston 34 upon command and allow the hydrostatic pressure to drive it toward the piston stop 36.

The seismic source illustrated in FIG. 5 operates as follows: the ceramic cap 20''' is broken by a small explosive device like a blasting cap 22' (FIG. 2), allowing a wall of water to rush in; the water drives piston 34 with a force of PA, where P is the hydrostatic pressure and A is the area of piston 34; piston 34 serves to regulate the inrushing water such that the collapse is along a flat surface; piston 34 picks up speed as it gains more and more kinetic energy, the kinetic energy being approximately equal to PA times the distance the piston travels down cylindrical body 24''' within the vessel chamber 19'''; piston 34 hits piston stop 36; piston stop 36 acts as a plastic spring, rapidly decelerating the piston and thereby generating a potential acoustical source; the deceleration, and therefore, the shape of the output signal is governed by the stiffness and shape of piston stop 36. The seismic source can be recovered and reused upon replacing piston stop 36 and cap 20'''.

The available energy for a device of the embodiment of FIG. 5 with an inside diameter of 4 inches and a nominal piston-travel distance of 8 inches is:

| Ambient Pressure (psi) | Available Energy (watt/seconds) |
|---|---|
| 1,000 | 11,400 |
| 5,000 | 57,000 |
| 10,000 | 114,000 |
| 15,000 | 171,000 |
| 20,000 | 228,000 |

By shaping the deceleration, the amount of energy going into low-frequency propagation of sound can be controlled. To understand how the shape of the output can be controlled, it must be recognized that the radiated pressure results primarily from the volume acceleration of the cavity. It is monopole-like and is given by the approximation $$P_{rad} \approx \rho \ddot{V}/4\pi r$$

where $P_{rad}$ is the pressure at a distance r from the source, through a medium whose density is $\rho$. The volume acceleration of the cavity as a function of time is given as $\ddot{V}_{(t)}$ and is directly proportional to the acceleration of the piston 34. The shape of the output signal is controlled by shaping the deceleration of piston 34, which is done by choosing an appropriate piston stop 36. For example, if piston stop 36 functions as a plastic spring in the shape of a truncated cone (cone angle 60°) made of, for example, annealed aluminum, the spring of that piston stop is nearly linear, with a constant equal to K. The volume deceleration is then governed by the kinetic energy of piston 34 (including the entrained fluid), the spring constant K and the system mass M (piston mass plus fluid mass), i.e., $$\vec{V}_{(t)} = A\, w_0 \sqrt{\frac{2(KE)}{M}} \sin w_0 t,\ 0 < t < \frac{\pi}{2w_0}$$

A = piston cross sectional area
KE = kinetic energy where the system's resonance frequency is given by $$w_0 = \sqrt{K/M}$$

and the pulse width is approximately $$T \approx \pi/2w_0$$

and KE is the kinetic energy of the flying piston (approximately equal to hydrostatic pressure x piston cross sectional area x the distance the piston travelled).

The controlled implosive seismic source pursuant to the present invention may be carried downhole by a tool similar to the CST-U core gun manufactured by Schlumberger Well Services. As shown in FIG. 4, a plurality of seismic sources pursuant to the present invention, labeled generally as 10, are attached to a tool 12 by a carrier 14. A series of the seismic sources may be placed along carrier 14 separated by resilient standoffs 16. Resilient standoffs 16 are used to absorb a portion of the shock from one source implosion such that other sources 10 are not jarred loose or prematurely detonated.

Other elements of the carrier 14 are conventional and are not shown. For example, firing mechanisms used to ignite explosive material in seismic sources 10 and selectively implode those sources from the surface could be any manual firing mechanism or automatic firing mechanism well known in the art.

Figure 6:
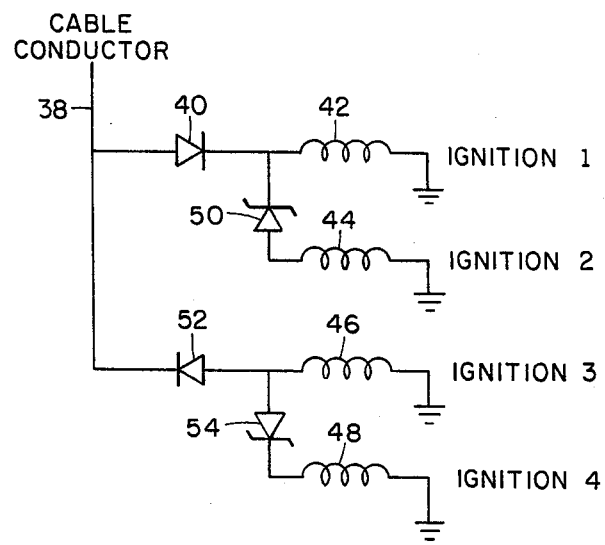
FIG. 6 is a diagram of one of the possible selective firing systems.

One selective firing system, illustrated in FIG. 6, uses diodes and blocking rectifiers in conjunction with the standard seven conductor logging cable. That system could selectively detonate up to 28 selective implosions. FIG. 6 illustrates the connection for one conductor 38 of the seven standard conductors in a logging cable. Conductor 38 is connected to a first ignitor or firing mechanism 42 through diode 40, and a second ignitor or firing mechanism 44 though an avalanche or similar break-down device, for example zener diode 50 (which, for example, may be a 100 V zener diode). Equivalent or similar switching or voltage level circuits can be used, the result being that ignitor 42 and ignitor 44 may be selectively fired by changing the level of the applied voltage. Similarly, ignitors 46 and 48 are electrically connected to conductor 38 through diode 52 and zener diode 54 with the polaritites reversed. Thus, the same voltage level change used to effect the selective firing of ignitors 42 and 44 may be used to selectively fire ignitors 46 and 48 by reversing the polarity of the applied voltage. The result is that with four voltages, for example, −200 VDC, −100 VDC, +100 VDC, and +200 VDC, four selective firings can result on each of the seven cable conductors.

A second exemplary firing system (not shown) would use downhole standard digital switching to connect a selected implosion source to a cable wire such that initiation current would be sent to the selected chamber by a surface power source. Systems such as this are known in the art.

A third exemplary firing system (not shown) would also use downhole digital switching, but would initiate firing by a downhole capacitor, which would then be recharged from the surface between firings.

A fourth exemplary firing system (not shown) such as is used in the Schlumberger CST-U Coregun could be used in which the firing of one implosive source would mechanically pull an arming wire for firing the next implosive source.

The firing mechanism chosen is, of course, connected to the several seismic sources 10 by conventional electrical connection devices such as multiple pin connectors encased within a high pressure housing (not shown), except in the case of an external firing mechanism, in which no connection is required. The connector and housing should be able to withstand hydrostatic pressures up to 20,000 psi. Also standard switching electronics (not shown) and the actual wiring conncting the firing mechanism to seismic sources 10 should be contained within that high pressure housing. It is contemplated that fluid to air connectors (not shown) would be the preferred devices for connecting the switching electronics to the seismic sources 10.

The number of seismic sources 10 placed on the carrier 14 may vary according to the test results desired. For example, up to 40 or 50 "shots" may be desired for periodic downhole tests. Periodic downhole tests are found desirable when the seismic detecting means are placed on the surface. Firing those shots at regular intervals will enable the operator reading the results to distinguish the pulses generated by the shots from background noise. That result is obtained because the shots will form pulses at regular intervals, whereas background noise forms pulses at random intervals.

One of the principal advantages of using hydrostatic pressure for powering a seismic source pursuant to the present invention is that the available power increases as the depth in the well increases. With a fixed power potential, such as is found in an explosive source, increases in depth usually result in more energy being lost, particularly when the seismic detecting means are placed on the surface. However, with the implosive seismic source pursuant to the present invention, that increase in hydrostatic pressure increases the power available to the seismic source 10 and compensates for any loss in power. Further, applicants have found that implosive seismic sources pursuant to the present invention avoid problems with the "bubble effect". The "bubble effect" is created when a mechanical device, such as an airgun, sets up resonance. That resonance is caused by the release of high pressure gas or air into the surrounding medium. As that gas expands, it tends to overexpand and then contract and expand again. That resonance causes a small "bubble wave" generated in addition to the primary signal wave generated by the mechanical action. The "bubble wave" further obscures valuable data and renders it more difficult to distinguish reflected waves from background noise.

In testing embodiments of the present invention, applicant has been able to achieve a radius of up to 3,100 feet using a downhole to surface configuration. In a downhole to downhole configuration, much further distances have been achieved. The high quality of the waves produced by controlled implosive downhole seismic sources pursuant to the present invention serve as ideal means for mapping out highly dipping subsurface structures such as salt domes and inclines. Further, the downhole to surface configuration generates a high percentage of low frequency waves, which better penetrate the weathered layer and are more easily distinguishable from background nise. In the downhole to downhole configuration, applicant has found that the controlled implosive seismic source of the present invention can generate higher than normal frequency waves (up to 300 Hz). Waves in that frequency range are desired because they generate higher resolution data regarding subsurface highly dipping structures such as salt domes and inclines. That frequency band is generally not obtainable using traditional surface seismic sources. By varying the depth of the implosive source and the seismic detecting means in the downhole to downhole configuration, the location and slope of a salt dome can be accurately mapped.

Although the invention has been described in conjunction with the foregoing specific embodiment, many alternatives, variations and modifications are apparent to those of ordinary skill in the art. Those alternatives, variations and modifications are intended to fall within the spirit and scope of the appended claims.

We claim:

1. An implosive downhole seismic source comprising:
 a generally cylindrical vessel body comprised of a material of sufficient strength to withstand the force of implosion;
 and end cap sealing said cylindrical vessel body to form a chamber, said end cap being comprised of a material capable of being selectively ruptured to cause an implosion under the hydrostatic pressure of the fluid into which said vessel body is lowered; and
 explosive means for selectively rupturing said end cap to implode the fluid surrounding said vessel body into said chamber as a result of the hydrostatic pressure of the fluid.

2. The seismic source of claim 1 wherein said chamber is evacuated when said end cap is assembled to said vessel body.

3. The seismic source of claim 1 wherein said end cap further comprises a blasting cap.

4. The seismic source of claim 1 further comprising a plurality of said vessels mounted to a downhole carrier for sequential implosion.

5. The seismic source of claim 1 further comprising a piston slidably disposed within said chamber.

6. The seismic source of claim 5 wherein said piston initially engages the walls of said cylindrical vessel body adjacent said end cap and is driven toward the opposite end of said chamber by the hydrostatic pressure of the fluid surrounding said vessel body when said end cap is ruptured.

7. The seismic source of claim 6 further comprising a plastic spring disposed in the opposite end of said chamber for decelerating said piston.

8. An implosive downhole seismic source comprising:
 a generally cylindrical vessel body comprised of a material of sufficient strength to withstand the force of implosion;
 an end cap sealing said cylindrical vessel body to form a chamber, said end cap being comprised of a material capable of being selectively ruptured to cause an implosion under the hydrostatic pressure of the fluid into which said vessel body is lowered;
 explosive means for selectively rupturing said end cap to implode the fluid surrounding said vessel body into said chamber;
 a piston slidably disposed within said chamber adjacent said end cap forceable toward the opposite end of said chamber when said end cap is ruptured; and
 a piston stop for decelerating said piston.

9. The seismic source of claim 8 wherein said piston stop is formed in the shape of a truncated cone.

10. An implosive downhole seismic source comprising:
 a downhole carrier;
 a plurality of generally cylindrical vessel bodies mounted to said downhole carrier, each of said vessel bodies being comprised of a material of sufficient strength to withstand the force of implosion;
 an end cap sealing each of said vessel bodies to form a chamber, each said end cap being comprised of a material capable of being selectively ruptured to cause an implosion under the hydrostatic pressure of the fluid into which said downhole carrier, having said vessel bodies mounted thereto, is lowered;
 explosive means for separately rupturing the end caps of said vessel bodies to implode the fluid surrounding said vessel body into the chamber; and
 circuit means for selective firing of ignitors to rupture the end cap of each of said vessel bodies mounted to said downhole carrier.

11. The seismic source of claim 10 wherein said downhole carrier is provided with resilient means for absorbing a portion of the shock from each source implosion.

12. A method of generating a downhole seismic source comprising:
 lowering a vessel body comprised of a material of sufficient strength to withstand the force of implosion, an end cap sealing the cylindrical vessel body to form a chamber comprised of a material capable of being selectively ruptured to cause an implosion, and explosive means for selectively rupturing said end cap downhole;
 actuating the explosive means to rupture the end cap to implode the fluid surrounding the vessel body into the chamber as a result of downhole hydrostatic pressure; and
 recovering the vessel body for re-use.

13. The method of claim 12 further comprising changing the size of the opening in the vessel body sealed by the end cap to create seismic waves having various desired characteristics when the vessel chamber is imploded.

14. The method of claim 12 further comprising changing the shape of the vessel body to alter the pattern of the seismic waves reflected by the vessel body when the vessel chamber is imploded.

15. The method of claim 12 further comprising increasing the surface area on which the implosion impacts to increase the percentage of low frequency propagating waves generated by implosion of the vessel chamber.

16. The method of claim 12 further comprising forcing a piston slidably disposed within the vessel chamber from an initial position adjacent the end cap toward the opposite end of the chamber with the hydrostatic pressure of the fluid surrounding the vessel body.

17. The method of claim 16 further comprising decelerating the piston.

18. The method of claim 17 further comprising shaping the deceleration of the piston to control the propagating of low frequency seismic waves generated by implosion of the chamber.

19. The method of claim 16 further comprising decelerating the piston with a piston stop disposed in the opposite end of the chamber.

20. The method of claim 19 further comprising shaping the deceleration of the piston by changing the shape of the piston stop to control the propagating of low frequency seismic waves generated by implosion of the chamber.

* * * * *